United States Patent [19]

Jamieson et al.

[11] 4,037,239
[45] July 19, 1977

[54] MICROFILM CAMERA AND PHOTOGRAPHIC FILM HANDLING APPARATUS WITH AN ACTUABLE FILM CLAMPING DEVICE

[75] Inventors: John Jamieson, Los Gatos; Henry F. Price, Laguna Niguel; William O. Butts, Irvine, all of Calif.

[73] Assignee: Bell & Howell Company, Chicago, Ill.

[21] Appl. No.: 536,701

[22] Filed: Dec. 26, 1974

[51] Int. Cl.² .................. G03B 27/44; G03B 17/00
[52] U.S. Cl. ........................... 354/203; 355/64
[58] Field of Search ............ 354/203, 159, 123, 120, 354/124, 202; 355/286, 72, 95, 53, 54, 64, 65; 352/223, 225, 227, 79, 80, 53

[56] References Cited

U.S. PATENT DOCUMENTS

| | | | |
|---|---|---|---|
| 2,178,228 | 10/1939 | Goldsmith | 352/53 |
| 2,282,427 | 5/1942 | Powers | 354/203 |
| 2,293,195 | 8/1942 | Cohen | 354/203 X |
| 2,741,168 | 4/1956 | Schreiber | 354/202 X |
| 2,788,724 | 4/1957 | Weiss | 354/203 |
| 3,007,382 | 11/1961 | Bok | 354/203 X |
| 3,252,370 | 5/1966 | Luther | 354/203 X |
| 3,854,142 | 12/1974 | Whitley et al. | 354/202 X |

FOREIGN PATENT DOCUMENTS

| | | | |
|---|---|---|---|
| 971,903 | 3/1959 | Germany | 352/223 |
| 177,002 | 3/1922 | United Kingdom | 352/227 |

*Primary Examiner*—Donald A. Griffin
*Attorney, Agent, or Firm*—Benoit Law Corporation

[57] ABSTRACT

A camera for photographing information on microfilm comprises structure defining an image aperture, a lens system for projecting an image of the information to be photographed along an optical path through the image aperture, and a device for selectively clamping microfilm against the image aperture defining structure. The image aperture defining structure and the clamping device are mounted and restrained against lateral movement relative to the optical path. A carriage is movable relative to the image aperture defining structure, the lens system and the clamping device, and carries equipment for advancing microfilm between the image aperture defining structure and the clamping device.

A photographic film handling apparatus wherein photographic film is positioned at a structure defining an image aperture comprises a film pressure plate having a cluster of air holes for an escape of air from a space between the film pressure plate and adjacent photographic film. The film pressure plate is mounted adjacent the aperture defining structure, and is actuated relative to the aperture defining structure.

33 Claims, 9 Drawing Figures

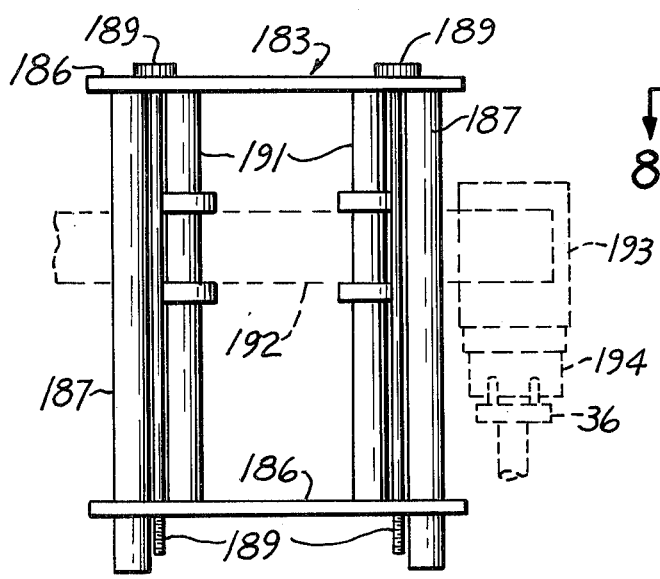

MICROFILM CAMERA AND PHOTOGRAPHIC FILM HANDLING APPARATUS WITH AN ACTUABLE FILM CLAMPING DEVICE

BACKGROUND OF THE INVENTION

1. Field of the Invention

The subject invention relates to photographic equipment and, more specifically, to microfilm cameras and other film handling apparatus.

2. Prior-Art Background

Modern data storage and retrieval relies increasingly on microfilm recording of the data. Microfilm recording, including microfiche techniques, drastically reduces required storage space for the data and renders the recorded data easily accessable and retrievable.

In the field of data processing, progress in the microfilm area has been stifled for a long time by a lack of microfilm cameras which in terms of accuracy, precision and film handling capability would be up to the attainable speed and resolution of cathode ray tube systems and other computer or data processor readout equipment.

Developments in this field in recent years have led to enormmously complex and expensive camera systems, many of which fell short of even approaching the potentialities of electronic computers and other data processors.

In particular, the provision of equipment for high-speed and high-precision film positioning at the image aperture continues to be a problem, especially at the extremely short focal lengths prevalent in the microimaging art.

Two major aspects of the latter problem have become apparent, namely the alternate clamping and release of the film at the image aperture, and the lateral movement of the film and subsequent positioning of desired film portions at that aperture.

Proposals in the latter area have proceeded on the basis of a provision of a carriage on which film transport equipment was located. A problem in the latter area resides in the lack of a carriage drive that, in terms of speed and accuracy, would be compatible with data processing systems and that at the same time would keep the camera within economically feasible limits.

Another persistent problem concerns the lack of adequate film format exchange equipment that would be adapted in terms of attainable speed of exchange to the requirements of data processing systems and that, at the same time, would be characterized by an economy of parts.

While emphasis has so far been placed herein on the requirements of microfilm cameras in data processing systems, it is to be understood that various aspects of the subject invention also have utility in other microfilm apparatus or even in areas of the broad field or film handling equipment.

SUMMARY OF THE INVENTION

It is broadly an object of this invention to overcome each of the above mentioned disadvantages.

It is a related object of the invention to provide improved photographic film handling equipment.

It is a similar object of this invention to provide improved microfilm camera equipment.

It is a related object of this invention to provide improved microfilm cameras adapted to the needs of computer and other data processing systems.

It is a further object of this invention to provide improved equipment for selectively clamping and releasing microfilm at an image aperture.

It is a related object of this invention to provide improved film positioning equipment for microfilm cameras or other photographic film handling apparatus.

It is a further object of this invention to provide microfilm cameras or other film handling equipment having improved film format exchange facilities.

Other objects of the invention will become apparent from the further course of this disclosure.

From a first aspect thereof, the subject invention resides in a camera for photographing information on microfilm, comprising in combination, means defining an image aperture, means including a lens system for projecting an image of said information along an optical path through said image aperture, means for selectively clamping microfilm against said image aperture defining means, means connected to said image aperture defining means and said clamping means for mounting and restraining said image aperture defining means and said clamping means against lateral movement relative to said optical path, a carriage, means for moving said carriage relative to said image aperture defining means, projecting means and clamping means, and means on said carriage for advancing microfilm between said image aperture defining means and clamping means.

From another aspect thereof, the invention resides in a photographic film handling apparatus wherein photographic film is positioned at a structure defining an image aperture and, more specifically, resides in the improvement comprising, in combination, a circular film pressure plate having a cluster of air holes for an escape of air from a space between the film pressure plate and adjacent photographic film, means for mounting said film pressure plate adjacent said aperture defining structure, and means coupled to said film pressure plate for actuating said film pressure plate relative to said aperture defining structure including means for mounting said circular film pressure plate for rotary motion about an axis which is perpendicular to a circular surface of said film pressure plate.

From yet another aspect thereof, the invention resides in a photographic film handling apparatus wherein photographic film is positioned at a structure defining an image aperture and, more specifically, resides in an improvement comprising, in combination, a circular film pressure plate, having an even circular surface for engaging said film means for mounting said film pressure plate adjacent said aperture defining structure, said mounting means including means for mounting said circular film pressure plate for rotary motion about an axis which is perpendicular to said circular surface of said film pressure plate, and means coupled to said film pressure plate for actuating said film pressure plate relative to said aperture defining structure.

From still another aspect thereof, the invention resides in a camera for photographing information on a microfilm and, more specifically, resides in the improvement comprising, in combination, a base, means defining an image aperture, means connected to said base for mounting said means defining said image aperture, means including a lens system operatively associated with said image aperture defining means for projecting an image of said information along an optical path through said image aperture, means for advancing said microfilm relative to said image aperture in a first direction, means for advancing said microfilm relative to said image aperture in a second direction extending at an angle to said first direction, including a carriage for carrying said means for advancing said microfilm in said first direction, and means on said base for selectively moving said carriage relative to said base, image aperture defining means and projecting means, means for selectively clamping advanced microfilm against said image aperture defining means, and means connected to said image aperture defining means, clamping means and base independently of said carriage for mounting and restraining said image aperture defining means and said clamping means against lateral movement relative to said optical path during movement of said carriage.

BRIEF DESCRIPTION OF THE DRAWINGS

The invention and its aspects and objects will become more readily apparent from the following detailed description of preferred embodiments thereof, illustrated by way of example in the accompanying drawings, in which like reference numerals designate like or functionally equivalent parts, and in which:

FIG. 3 is a side view taken on the line 3 — 3 of FIG. 2, of a belt drive system employed in the apparatus of FIGS. 1 and 2;

FIG. 4 is an elevation of a film guide unit which may be employed in the apparatus of FIGS. 1 and 2;

FIGS. 5 and 6 are rear elevations of optical units that may be employed in the apparatus of FIGS. 1 and 2;

FIG. 7 is a side view of a film clamping device taken on the line 7 — 7 in FIG. 1;

FIG. 8 is a front view of the film clamping device of FIG. 7, taken on the line 8 — 8 of FIG. 7; and FIG. 9 is a rear view of an element of the film clamping device taken on the line 9 — 9 of FIG. 7.

DESCRIPTION OF PREFERRED EMBODIMENTS

Figure 1:
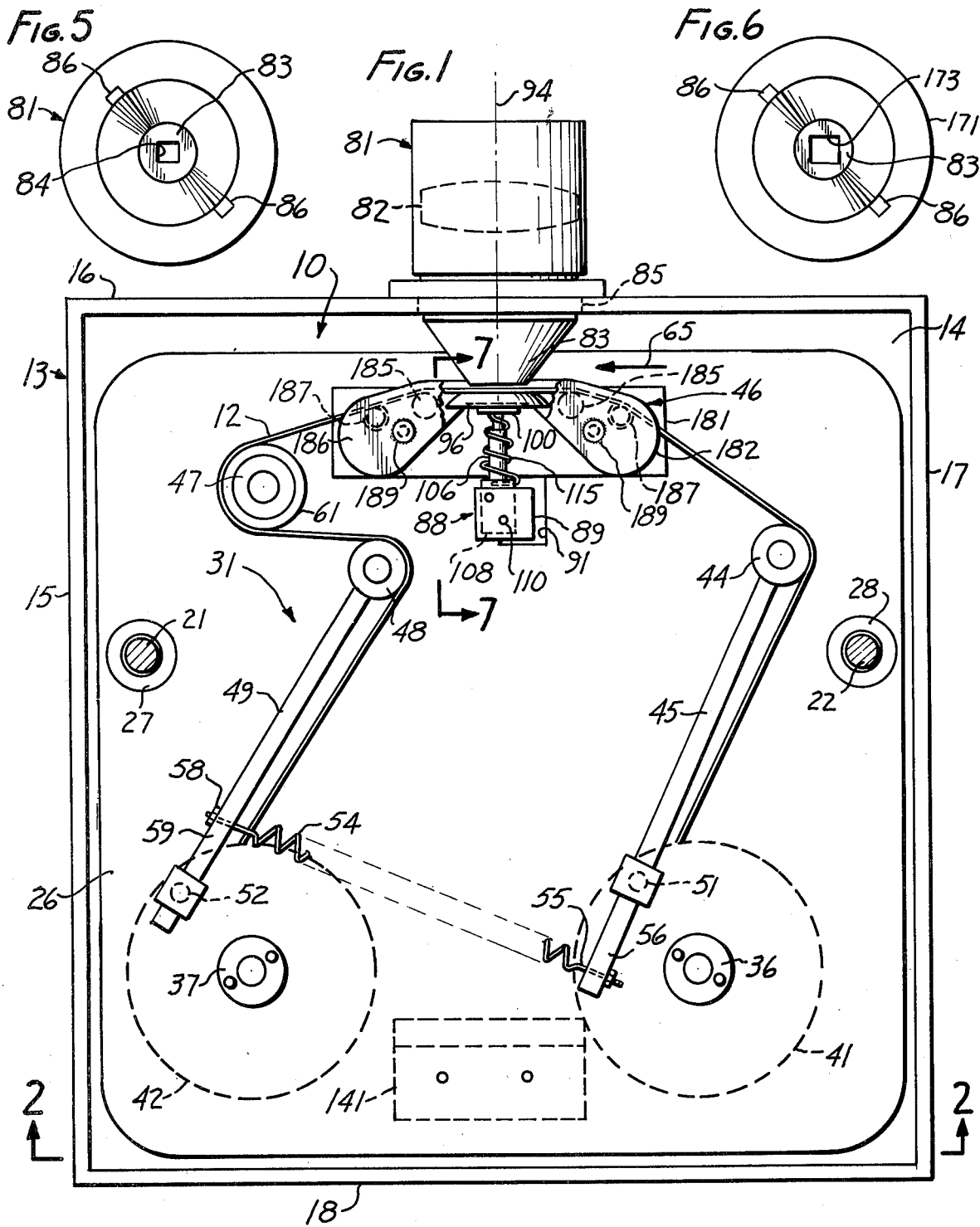
FIG. 1 is a plan view of a microfilm camera in accordance with a preferred embodiment of the subject invention.

The drawings illustrate a camera 10 and associated equipment for photographing information on microfilm. Typically, the illustrated camera will be employed for photographing pictorially displayed information from a cathode ray tube of a computer or data processor (not shown) onto microfilm 12. It is, however, to be understood that the illustrated equipment may also be employed for other types of microfilm cameras or even for various types of photographic film handling equipment, as may become apparent to those skilled in the art from the subject extensive disclosure.

The camera 10 has a light-tight housing 13 comprising a bottom 14 (see FIG. 2) and four side walls 15, 16, 17 and 18 (see FIGS. 1 and 2) joined to or integral with the bottom 14. A light-tight removable cover 19, shown only in FIG. 2, completes the camera housing 13.

A pair of upright posts or stanchions 21 and 22 arise from the camera bottom 14 and are attached thereto at 23 and 24. The stanchions 21 and 22 guide a carriage 26 having longitudinal or sleeve bearings 27 and 28 attached thereto. The stanchion 21 extends through the carriage bearings 27 and the stanchion 22 extends through the carriage bearing 28.

A film transport 31 is located on the carriage 26.

Figure 2:
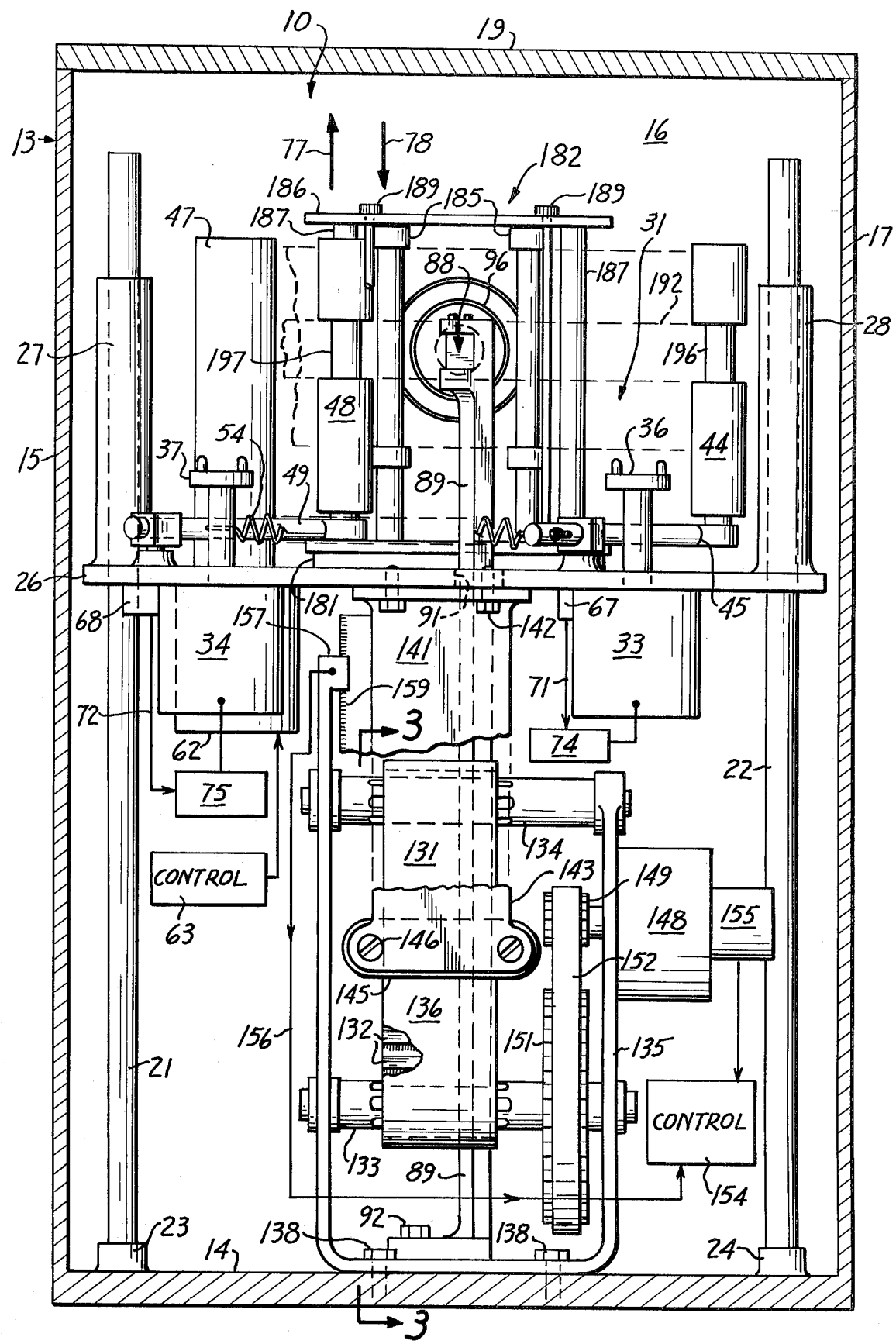
FIG. 2 is an elevation taken on the line 2 — 2 in FIG. 1.

The film transport 31 is part of a film advance drive assembly including a film supply reel drive motor 33 and a film takeup reel drive motor 34, both attached to the carriage 26 at the underside thereof as seen in FIG. 2.

When energized, the motor 33 rotates a supply reel drive member 36 and the motor 34 rotates a takeup reel drive member 37. To avoid crowding of the drawings, no film reels or similar devices have been shown in FIGS. 1 and 2 on the members 36 and 37. However, it is to be understood that the illustrated equipment may be employed with, or readily adapted to, any suitable conventional film reel or cartridge which may be reasonably accommodated within the confines of the camera housing 13. Accordingly, film supply and takeup reels or cartridges are only shown symbolically by dotted circles at 41 and 42 in FIG. 1.

The microfilm 12 extends from the reel 41 to an idler roller 44 of a first tension arm 45, across a film guide unit 46, over a capstan 47, to an idler roller 48 of a second tension arm 39, and to the takeup reel 42.

The tension arms 45 and 49 are pivoted at 51 and 52 respectively and form loops of varying size between the reel 41 and film guide unit 46 and between the capstan 47 and reel 42. It is a main function of the tension arms 45 and 49 to equalize the tension across the capstan 47 so that the film may be driven without the need of the conventional nip roller at the capstan. To this end, the film 12 is wrapped around the capstan 47 in a 150° to 200° wrap and tension arms 45 and 49 are interconnected by a helical spring 54 having a first end 55 attached to a portion 56 of the first tension arm situated beyond the pivot 51 as seen from the idler roller 44, and having a second end 58 attached to a portion 59 of the second tension arm located on the same side of the pivot 52 as the idler roller 48.

This "across the pivots" spring bias has been found to promote an excellent tension equalization of the film across the capstan 47 for a rapid and slip-free traction of the film by the capstan. That traction may be further increased in a conventional manner by equipping the capstan 47 with an outer sleeve 61 of rubber or another elastomer.

The capstan 47 is driven by a capstan motor 62 which is attached to the carriage 26. The capstan motor 62 may be energized by a control drive 63. That control drive is not particularly illustrated since it does not form part of the subject invention and since capstan drive controls are well known in the specialized film drive and magnetic recording drive arts. The chief purpose of the film drive is to advance the film in a controlled manner in a first direction indicated by the arrow 65.

The angular position of the tension arms 45 and 49 controls in a conventional manner the energization of the reel drive motors 33 and 34. To this end, the tension arms 45 and 49 actuate angular position pick-up devices 67 and 68.

The pick-up devices 67 and 68 may be of a variable resistor or photoelectric type providing in lines 71 and 72 signals corresponding to the angular position of the tension arms 45 and 49, respectively. The signal indicative of the angular position of the tension arm 45 is applied by the line 71 to a control 74 which accordingly varies the energization of the reel motor 33.

Similarly, the signal indicative of the angular position of the tension arm 49 is applied by the line 72 to a control 75 which accordingly varies the energization of the reel drive motor 34. Again, the controls 74 and 75 are not particularly illustrated, since their nature and function are well known in the art of specialized film drives and magnetic recording tape transports. In brief, as the loop of film between the reel 41 and the film guide unit 46 decreases, the pick-up 67 and control 74 will cause the drive 33 to issue more film from the reel 41. Conversely, if the size of the loop between the capstan 47 and the reel 42 increased, the pick-up 68 and control 75 will cause the reel drive 34 to increase the takeup of film on the reel 42.

The stanchions 21 and 22 and the longitudinal or axial bearings 27 and 28 cooperate in restricting movement of the carriage 26 to movement in parallel second and third directions being opposed to each other. In FIG. 2, these directions are indicated by the arrows 77 and 78 and it will be noted that, in the case of the apparatus shown in FIGS. 1 and 2, the direction 77 is an up direction while the direction 78 is a corresponding opposite down direction. The directions 77 and 78 both extend at right angles to the direction of film movement 65 imposed by the film drive of the transport 31 on the carriage 26. It will thus be noted that the combination of the film drive including the transport 31 on the carriage 26 and the carriage 26 itself with the equipment for driving it, more fully described below, cooperate in placing any desired portion of the film 12 at the image aperture presently to be described of an optical unit 81.

The optical unit 81 is shown in FIGS. 1 and 5 includes a photographic lens system symbolically shown at 82 and an integral extension 83 defining an image aperture 84. The upright wall 16 of the housing 13 has an aperture 85 for receiving the optical unit 81 at the extension 83. Part of a releasable bayonet attachment is shown at 86 in FIG. 5, it being understood that a corresponding bayonet socket (not shown) is provided in or at the housing wall 16, whereby to provide a means for releasably mounting the optical unit 81 on the camera 10.

The camera further includes a device for selectively clamping microfilm 12 against the optical unit extension 83 adjacent the image aperture 84. The clamping device 88 is mounted on an upright bracket or stanchion 89 which extends through an aperture 91 in the carriage 26 and which is fastened to the camera base plate or bottom at 92 independently of the carriage 26. In this manner, the stanchion 89, during movement of the carriage 26 and otherwise, mounts the film clamping device 88 against lateral movement relative to an optical path 94 along which an image of the input information is projected by the lens system 82 through the image aperture 84.

The clamping device 88 includes a film pressure plate 96. In accordance with the preferred embodiment illustrated in FIGS. 1, 2, 7, 8 and 9, the film pressure plate is circular, having an even circular surface 96' (see FIG. 7) for engaging the film (see FIG. 1), and is laterally dished for maximum protection of the film 12 during rapid advancement and clamping.

Prior-art equipment of the subject type was burdened with extreme tolerance problems stemming from a carriage-mounted image aperture and film pressure plate. According to the subject invention, these problems are eliminated by the stationary or fixed aperture 84 or 173 and pressure plate 96, thereby relieving the carriage design of extreme tolerance problems.

By way of example, the circular pressure plate 96 may be formed of a light metal, such as aluminum which may be anodized.

As best seen in FIG. 8, the film pressure plate 96 has a cluster of air holes 98, as well as a circular air hole arrangement 99 for an escape of air from space between the film pressure plate 96 and adjacent microfilm 12. In practice, this has been found an important feature of the illustrated preferred embodiment of the invention, since it eliminates prior-art blurring or defocusing effects attributable to the formation of an air cushion or a shock wave between the pressure plate and the film when the pressure plate rapidly clamped the film against the optical unit extension 83 at the aperture 84.

The clamping device 88 further includes a mounting plate 100 having a further cluster of air holes 101 corresponding to the cluster 98 in the film pressure plate. A washer-shaped member 102 of rubber or another elastic or elastomric material is disposed between and connects the film pressure plate 96 to the mounting plate 100. The member 102 is preferably circular and may be connected to the film pressure plate 96 and mounting plate 100 by an adhesive substance. The elastic member 102 has an aperture 103 communicating with the air hole clusters 98 and 101.

In this manner, air can escape and enters through the film pressure plate 96, mounting plate 100 and elastic interconnecting member 102. In addition, the elastic member 102 cushions or absorbs shock loads which would otherwise affect the film.

The mounting plate 100, in turn, is mounted on a reduced diameter portion 105 of a ferromagnetic movable armature or plunger 106. The plunger 106 extends into a solenoid 107 having a stationary armature 108.

The solenoid 107 and stationary armature 108 are connected to the stanchion or mounting bracket 89 by screws or other fasteners 110. In this manner, the clamping device actuator represented by the solenoid 107 and armature 108 is maintained stationary relative to the wall 16, optical unit extension 83 and image aperture 84, independently of the movement of the carriage 26.

The solenoid 107 develops a magnetic force which attracks the plunger 106 to the stationary armature 108 upon closure of a normally open switch 113, which connects the solenoid to a source of electric power, symbolized by plus and minus signs.

In this manner, the film pressure plate 96 is moved away from the aperture 84 for the release of the film 12 between the optical unit extension 83 and film pressure plate 96.

During the actuation of the switch 113, film 12 may thus be advanced by the transport 31 between the film pressure plate and the aperture 84.

Upon release of the switch 113, the film pressure plate 96 is rapidly advanced by a helical spring 115 toward the image aperture 84 and microfilm 12 is then clamped against the optical unit extension 83. An image of the input information from a cathod ray tube or other input device (not shown) is then projected by the lens system 82 through the image aperture 84 onto the photographic film 12. Because of the action of the film pressure plate 96, an excellent positioning of the microcilm 12 at the image aperture 84 is realized.

The actuator spring 115 which biases the film pressure plate toward the image aperture defining extension 83 has a first end 117 retained stationary relative to the film pressure plate by the stationary clamping device armature 108.

The clamping device biasing spring 115 has a second end 118 which extends around the reduced diameter portion 105 of the solenoid plunger 106 in the lost-motion connection. On the one hand, this allows the film pressure plate 96 a certain lost-motion travel relative to the spring end 118 and the stationary solenoid armature 108. On the other hand, the spring 115, through its second end 118, will restrain the film pressure plate 96 from further outward motion at the end of the lost-motion travel.

In practice, these are important features of the illustrated preferred embodiment, since they prevent malfunction of, and damage to, the equipment both when the optical unit 81 is inserted in the camera and when the same is removed so that the bias spring 115 would tend to urge the film pressure plate outwardly as seen from the stationary armature 107. As another important feature of the illustrated preferred embodiment, the solenoid plunger 106 is free of lateral restraint whereby the film pressure plate 96 is mounted for rotary motion about an axis 121 which is prependicular to a circular surface of the film pressure plate, as best seen in FIG. 7. This ability to carry out a rotary motion prevents the film pressure plate from becoming stuck in any angular position and from exerting an uneven load on the microfilm 12.

Where necessary, the optical unit 81 may include a camera shutter (not shown), which may be of a conventional type. A shutter may, however, be dispensed with if an electronic shutter action results from an appropriate and conventional energization of the cathode ray tube or other display device (not shown) from which the lens system 82 projects the input image of the camera 10.

The switch 113 may be replaced by an electronic switching device or circuit for rapid actuation of the film pressure plate 96.

Such an electronic switching device or circuit would not be part of the subject invention and is thus not illustrated in the drawings.

The drive of the carriage 26 which drives this carriage with bearings 27 and 28 selectively up and down the stanchions 21 and 22 in the direction of the arrows 77 and 78 includes an endless timing belt 131 having a plurality of teeth 132 located at the inside thereof in an endless arrangement as seen in FIG. 3. Timing belts as such are well known in the art of servo mechanisms.

As shown in FIGS. 2 and 3, a pair of toothed pinions 133 and 134 are rotatably mounted in spaced relationship by a frame 135 and cooperate in mounting the timing belt 131 in an endless loop having a straight portion 136 extending parallel to the above mentioned opposed directions of carriage movement 77 and 78. The frame 135 is attached to the base or bottom plate 14 of the camera housing at 138.

A bracket 141 is attached to the carriage 142 and serves as a means for transmitting motive power from the timing belt 131 to the carriage 26. To this end, the bracket 141 has a straight portion 143 extending parallel to the opposed directions of carriage movement 77 and 78 and to the straight portion 136 of the timing belt 131. The free end of the power transmitting bracket 141 is attached to the timing belt 131 at the straight belt portion 136 by fastening devices 145 and 146.

An electric motor 148 drives the timing belt 131 in a first sense for movement of the carriage 26 in the direction 77 and alternatively in an opposite second sense for movement of the carriage in the direction 78. To this end, the motor 148 rotates a pinion 149 which, in turn, drives a gear wheel 151 via an endless time belt 162. The gear wheel 151 is attached to or integral with the pinion 133.

The carriage drive motor 148 may be energized and controlled in any desired manner. For instance, the motor 148 may be energized by a control 154 which varies the energization of the motor 148 in response to a first signal provided by a tachometer 155 driven by the motor 148 and a second signal supplied via a line 156 by a carriage position sensing device 157. The tachometer 115, as well as the position sensing device 157, may be of a conventional type. For instance, the position sensing device 157 may include a photocell pick-up (not shown) which senses the position of the carriage 26 by means of an analog gray scale or digital line raster device 159 attached to the power transmitting bracket 141.

The carriage drive according to the subject invention and its preferred embodiments has been found very accurate and reliable in positioning the carriage 26 rapidly and with great precision. In the illustrated preferred embodiment, both elongate sides 136 and 162 of the timing belt 136 are parallel to the opposed directions 77 and 78 for a tighter control of the carriage positioning process without any objectionable play.

Also, all portions of the endless timing belt 131 are at all times located to one side of the carriage 26 for all positions of the carriage. This distinguishes itself favorably from prior-art carriage drives wherein a drive belt or cable extended on both sides of the carriage, thereby giving rise to objectionable play or lost motion.

The illustrated camera 10 is also characterized by a rapid and convenient adaptability to various film formats. Of primary interest in this respect are the 16mm microfilm format and the 105mm microfiche format. To serve these two formats, the illustrated camera not only includes the above mentioned optical unit 81 shown in FIGS. 1 and 5, but also a similar optical unit 171 shown in FIG. 6.

The optical unit 171 is exchangeable on the camera with the optical unit 81 and, for that purpose, also includes the bayonet socket locking devices 86. The optical unit 171 also has an integral extension 83 for defining an image aperture. The image aperture 173 defined by the latter extension has a different format than the image aperture 84 of the optical unit 81, corresponding to differences in image size and format between the two optical units 81 and 171.

The film clamping device 88 with film pressure plate 96 is common to the optical unit 81 and 171 as either is releasably mounted on the camera wall 16. Because of the stationary mounting of the armature 108 of the film clamping device 88 by the mounting bracket or stanchion 89, one and the same film pressure plate and clamping device may be used for all formats handled by the microfilm camera 10.

This dispenses with the prior-art necessity of having to exchange film pressure plates for different film formats. Also, it will be noted that the illustrated stationary mounting of the clamping device and the circular configuration of the film pressure plate 96 keeps the mass of the film pressure plate at a minimum for rapid and accurate actuation at a minimum of motive power.

The illustrated microfilm camera also includes facilities for alternatively guiding a film having a first format (e.g. 105mm) and a film having a second format (e.g. 16mm) in between the film pressure plate 96 and the aperture defining structure 83 of either of the optical units 81 and 171. In this respect, it is to be understood that neither of the optical units 81 and 171 is necessarily restricted to a specific film format. Rather, the optical units 81 and 171 may be designed in a conventional manner so as to be usable with either film format. For instance, one of the units 81 and 171 may have a 24× lens system and the other of these units may have a 42× lens system.

The film format exchange facilities of the illustrated preferred camera embodiment include a film guide base 181 located on the carriage 26 in the vicinity of the film pressure plate 96, and two exchangeable film guide units 182 shown in FIGS. 1 and 2 and 183 shown in FIG. 4 for guiding, respectively, film having the mentioned first format (e.g. 105mm) and film having the mentioned second format (16mm).

The film guide unit 182 includes cylindrical film guide members 185 mounted in a frame 186 comprising cylindrical posts 187 which may be insertable into corresponding holes (not shown) of the film guide base 181.

The film guide unit 182 includes two manually actuable elongate screws 189 which releasably anchor the unit 182 to the film guide base 181. The configuration of the cylindrical film guide members 185 is adapted to the first film format.

The film guide unit 183 shown in FIG. 4 is closely similar to the the film guide uint 182 so that like reference numerals are employed to designate like or functionally equivalent parts. Instead of the cylindrical film guide members 185 of the unit 182, the unit 183 has cylindrical film guide members 191, the configuration of which is adapted to the second or 16mm film format shown in dotted lines at 192. As also shown in dotted outline in FIG. 4 at 193 and 194, respectively, the second format or 16mm film may be dispensed from a cartridge jcustomary with that format and the reel drive member 36 may be equipped with an adaptor 194 for accommodating that cartridge. The tension arm rollers 44 and 84 have cylindrical cutouts 196 and 197 for accommodating the smaller film format.

The obvious ease with which the film guide units 182 and 183 are mutually exchanged greatly augments the format adaptability of the illustrated camera in terms of speed and operating convenience.

We claim:

1. In a camera for photographing information on microfilm, the improvement comprising in combination:
   means defining an image aperture;
   means including a lens system for projecting an image of said information along an optical path through said image aperture;
   means for selectively clamping microfilm against said image aperture defining means;
   means connected to said image aperture defining means and said clamping means for mounting and restraining said image aperture defining means and said clamping means against lateral movement relative to said optical path;
   a carriage;
   means for moving said carriage relative to said image aperture defining means, projecting means and clamping means; and
   means on said carriage for advancing microfilm between said image aperture defining means and clamping means.

2. A camera as claimed in claim 1, wherein:
   said image aperture defining means are integral with said projecting means.

3. A camera as claimed in claim 1, wherein: said clamping means include film pressure plate means and actuator means for said pressure plate means including a first actuator part, a second actuator part coupled to said film pressure plate means and movable relative to said first actuator part, and means for providing an actuating force between said first and second actuator parts; and
   said mounting and restraining means include means connected to said image aperture defining means, to said projecting means and to said first actuator part of said clamping means for maintaining said image aperture defining means and said first actuator part stationary relative to said projecting means.

4. A camera as claimed in claim 1, wherein:
   said image aperture defining means are integral with said projecting means;
   said clamping means include film pressure plate means and actuator means for said pressure plate means including a first actuator part, a second actuator part coupled to said film pressure plate means and movable relative to said first actuator part, and means for providing an actuating force between said first and second actuator parts; and
   said mounting and restraining means include means connected to said integral image aperture defining and projecting means and to said first actuator part of said clamping means for maintaining said first actuator part stationary relative to said integral image aperture defining and projecting means.

5. A camera as claimed in claim 1, wherein:
   said microfilm advancing means include means for advancing said microfilm in a first direction; and
   said carriage moving means include means for moving said carriage in a second direction and in a third direction opposed to said second direction, said second and third directions extending at right angles to said first direction and means for restricting movement of said carriage to movement in said second and third directions.

6. A camera as claimed in claim 1, wherein:
   said clamping means include film pressure plate means having a cluster of air holes for an escape of air from space between the film pressure plate means and adjacent microfilm, and means for actuating said film pressure plate means.

7. A camera as claimed in claim 1, wherein:
   said clamping means include a circular film pressure plate, means for mounting said circular film pressure plate, and means for selectively actuating said film pressure plate toward and away from said image aperture defining means.

8. A camera as claimed in claim 1, wherein:
   said clamping means include a circular film pressure plate, means for mounting said circular film pressure plate for rotary motion about a longitudinal axis through said optical path, and means for selectively actuating said film pressure plate toward and away from said image aperture defining means.

9. In a camera for photographing information on microfilm, the improvement comprising in combination:
   means defining an image aperture;
   means including a lens system for projecting an image of said information along an optical path through said image aperture;
   means for selectively clamping microfilm against said image aperture defining means, said clamping means including a film pressure plate having a first cluster of air holes for an escape of air from a space between the film pressure plate and adjacent microfilm, means for mounting said film pressure plate including a mounting plate having a second cluster of air holes corresponding to said first cluster, means for connecting said film pressure plate to said mounting plate and providing air communication between said first and second cluster of air holes, and means connected to said mounting plate for actuating said film pressure plate relative to said image aperture defining means;

means connected to said image aperture defining means and said clamping means for mounting and restraining said image aperture defining means and said clamping means against lateral movement relative to said optical path;

a carriage;

means for moving said carriage relative to said image aperture defining means, projecting means and clamping means; and means on said carriage for advancing microfilm between said image aperture defining means and clamping means.

10. A camera as claimed in claim 9, wherein:
said connecting means include a member of elastic material connected to said film pressure plate and said mounting plate and having an aperture communicating with said first and second clusters of air holes.

11. A camera as claimed in claim 9, wherein:
said clamping means include a spring having first and second ends for biasing said film pressure plate toward said image aperture defining means, means for retaining said first spring end stationary relative to said film pressure plate, and means connected to said mounting plate and coupled to said second spring end for restricting motion of said film pressure plate away from said first spring end.

12. A camera as claimed in claim 11, wherein:
said motion restricting means include means for providing a lost-motion connection between said mounting plate and said second spring end.

13. In a camera for photographing information on microfilm, the improvement comprising in combination;
means defining an image aperture;
means including a lens system for projecting an image of said information along an optical path through said image aperture;
means for selectively clamping microfilm against said image aperture defining means, said clamping means including a circular film pressure plate having a first cluster of air holes for an escape of air from a space between the film pressure plate and adjacent microfilm, means for mounting said film pressure plate including a mounting plate having a second cluster of air holes corresponding to said first cluster, means for connecting said film pressure plate to said mounting plate and providing air communication between said first and second clusters of air holes, and means connected to said mounting plate for actuating said film pressure plate relative to said image aperture defining means;
means connected to said image aperture defining means and said clamping means for mounting and restraining said image aperture defining means and said clamping means against lateral movement relative to said optical path;
a carriage;
means for moving said carriage relative to said image aperture defining means, projecting means and clamping means; and p1 means on said carriage for advancing microfilm between said image aperture defining means and clamping means.

14. A camera as claimed in claim 13, wherein:
said film pressure plate mounting means include means for mounting said film pressure plate for rotary motion about a longitudinal axis through said optical path.

15. A camera as claimed in claim 13, wherein:
said mounting plate is circular.

16. A camera as claimed in claim 13, wherein:
said connecting means include a member of elastic material connected to said film pressure plate and said mounting plate and having an aperture communicating with said first and second clusters of air holes.

17. A camera as claimed in claim 13, wherein:
said mounting plate is circular; and
said connecting means include a circular member of elastic material connected to said film pressure plate and said mounting plate and having an aperture communicating with said first and second clusters of air holes.

18. In a photographic film handling apparatus wherein photographic film is positioned at a structure defining an image aperture, the improvement comprising in combination;
a circular film pressure plate having a cluster of air holes for an escape of air from a space between the film pressure plate and adjacent photographic film;
means for mounting said film pressure plate adjacent said aperture defining structure including means for mounting said circular film pressure plate for rotary motion about an axis which is perpendicular to a circular surface of said film pressure plate; and
means coupled to said film pressure plate for actuating said film pressure plate relative to said aperture defining structure.

19. A film handling apparatus as claimed in claim 18, wherein,
said actuating means include a spring having first and second ends for biasing said film pressure plate toward said image aperture defining structure, means for retaining said first spring end stationary relative to said film pressure plate, and means coupled to said film pressure plate and to said second spring end for restricting motion of said film pressure plate away from said first spring end.

20. A film handling apparatus as claimed in claim 19, wherein:
said motion restricting means include means for providing a lost-motion connection between said film pressure plate and said second spring end.

21. In a photographic film handling apparatus, wherein photographic film is positioned at a structure defining an image aperture, the improvement comprising in combination:
a film pressure plate having a cluster of air holes for an escape of air from a space between the film pressure plate and adjacent photographic film;
means for mounting said film pressure plate adjacent said aperture defining structure, said mounting means including a mounting plate having a further cluster of air holes corresponding to said cluster in said film pressure plate, and means for connecting said film pressure plate to said mounting plate and providing air communication between said clusters of air holes in said film pressure plate and in said mounting plate, said connecting means including a member of elastic material connected to said film pressure plate and to said mounting plate and having an aperture communicating with said clusters of air holes in said film pressure plate and in said mounting plate; and actuating means including means connected to said mounting plate for actuating said film pressure plate relative to said aperture defining structure.

22. A film handling apparatus as claimed in claim 21, wherein:
said mounting plate is circular; and
said member of elastic material is circular.

23. A film handling apparatus as claimed in claim 22, wherein:
said mounting means include means for mounting said circular film pressure plate for rotary motion about an axis which is perpendicular to a circular surface of said film pressure plate.

24. In a photographic film handling apparatus wherein photographic film is positioned at a structure defining an image aperture, the improvement comprising in combination:
a circular film pressure plate having an even circular surface for engaging said film;
means for mounting said film pressure plate adjacent said aperture defining structure, said mounting means including means for mounting said circular film pressure plate for rotary motion about an axis which is perpendicular to said circular surface of said film pressure plate; and
means coupled to said film pressure plate for actuating said film pressure plate relative to said aperture defining structure.

25. A film handling apparatus as claimed in claim 24, wherein:
said mounting means include a circular mounting plate connected to said means for mounting said circular film pressure plate for rotary motion, and a circular member of elastic material connected to said film pressure plate and to said mounting plate.

26. A film handling apparatus as claimed in claim 24, wherein:
said actuating means include a spring having first and second ends for biasing said film pressure plate toward said image aperture defining structure, means for retaining said first spring end stationary relative to said film pressure plate, and means coupled to said film pressure plate and including said second spring end for restricting motion of said film pressure plate away from said first spring end.

27. In a photographic film handling apparatus wherein photographic film is positioned at a structure defining an image aperture, the improvement comprising in combination:
a circular film pressure plate having an even circular surface for engaging said film;
means for mounting said film pressure plate adjacent said aperture defining structure, said mounting means including means for mounting said circular film pressure plate for rotary motion about an axis which is perpendicular to said circular surface of said film pressure plate; and
means coupled to said film pressure plate for actuating said film pressure plate relative to said aperture defining structure, said actuating means include a spring having first and second ends for biasing said film pressure plate toward said image aperture defining structure, means for retaining said first spring end stationary relative to said film pressure plate, and means coupled to said film pressure plate and to said second spring end for restricting motion of said film pressure plate away from said first spring end, said motion restricting means including means for providing a lostmotion connection between said film pressure plate and said second spring end.

28. In a camera for photographing information on microfilm, the improvement comprising in combination:
a base;
means defining an image aperture;
means connected to said base for mounting said means defining said image aperture;
means including a lens system operatively associated with said image aperture defining means for projecting an image of said information along an optical path through said image aperture;
means for advancing said microfilm relative to said image aperture in a first direction;
means for advancing said microfilm relative to said image aperture in a second direction extending at an angle to said first direction, including a carriage for carrying said means for advancing said microfilm in said first direction, said means on said base for selectively moving said carriage relative to said base, image aperture defining means and projecting means;
means for selectively clamping advanced mirofilm against said image aperture defining means; and
means connected to said image aperture defining means, clamping means and base independently of said carriage for mounting and restraining said image aperture defining means and said clamping means against lateral movement relative to said optical path during movement of said carriage.

29. A camera as claimed in claim 28, wherein:
said image aperture defining means are integral with said projecting means.

30. A camera as claimed in claim 28, wherein:
said clamping means include film pressure plate means and actuator means for said pressure plate means including a first actuator part, a second actuator part coupled to said film pressure plate means and movable relative to said first actuator part, and means for providing an actuating force between said first and second actuator parts; and
said mounting and restraining means include means connected to said base, to said image aperture defining means, to said projecting means and to said first actuator part of said clamping means for maintaining said image aperture defining means and said first actuator part stationary relative to said projecting means during movement of said carriage.

31. A camera as claimed in claim 28, wherein:
said image aperture defining means are integral with said projecting means;
said clamping means include film pressure plate means and actuator means for said pressure plate means including a first actuator part, a second actuator part coupled to said film pressure plate means and movable relative to said first actuator part, and means for providing an actuating force between said first and second actuator parts; and said mounting and restraining means include means connected to said base, to said integral image aperture defining and projecting means to said first actuator part of said clamping means for maintaining said first actuator part stationary relative to said integral image aperture defining and projecting means during movement of said carriage.

32. A camera as claimed in claim 28, wherein:
said carriage moving means include means for moving said carriage in a third direction opposed to said second direction, said second and third directions extending at right angles to said first direction, and means for restricting movement of said carriage to movement in said second and third directions.

33. A camera as claimed in claim 28, wherein:
said clamping means include film pressure plate means having a cluster of air holes for an escape of air from space between the film pressure plate means and adjacent microfilm, and means for actuating said film pressure plate means.

* * * * *